2,820,434
Patented Jan. 21, 1958

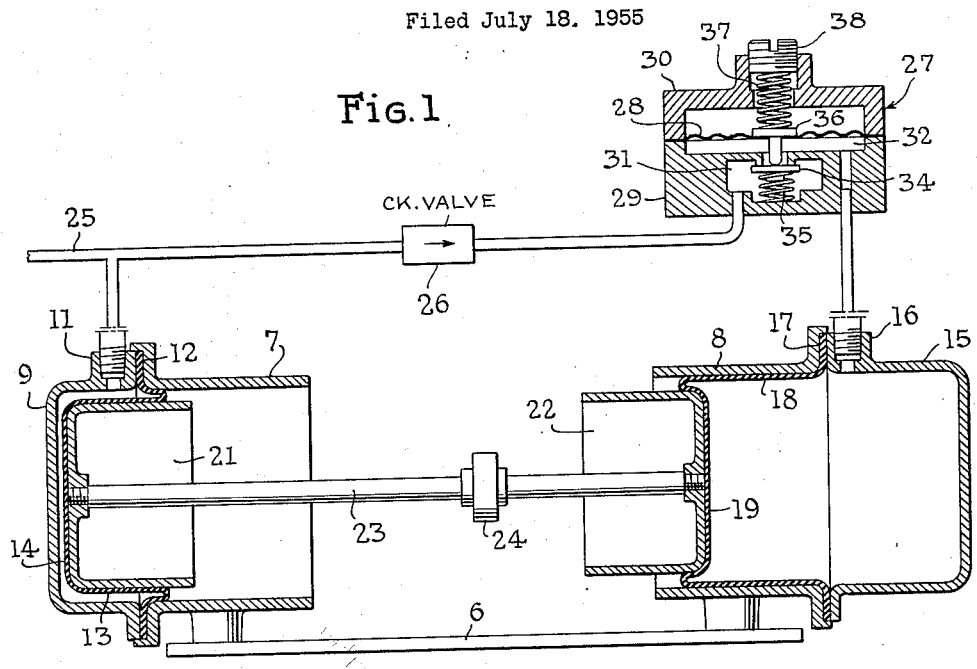
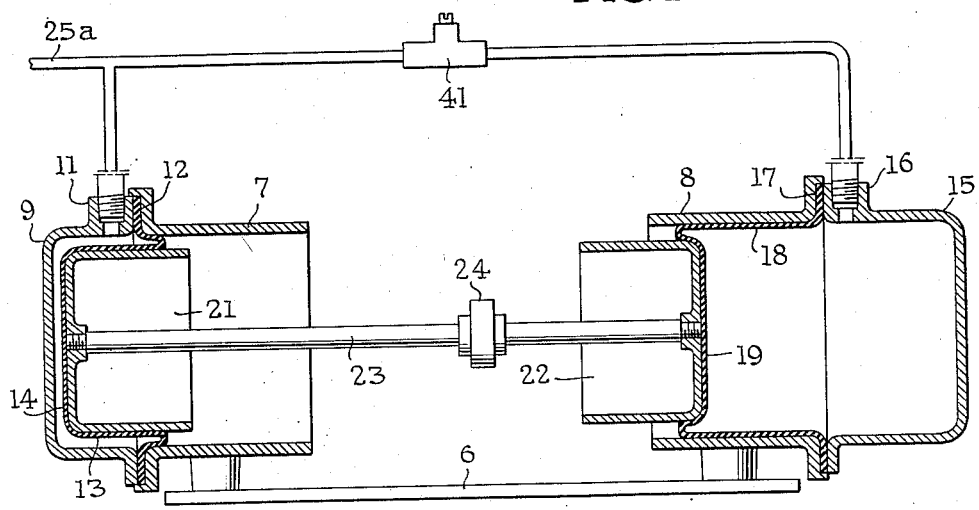

2,820,434

SINGLE-ACTING MOTOR WITH PNEUMATIC RETURN SPRING

Carl A. Otto, Milwaukee, Wis., assignor to Johnson Service Company, Milwaukee, Wis., a corporation of Wisconsin Application July 18, 1955, Serial No. 522,710

6 Claims. (Cl. 121—38)

This invention relates to damper motors for use in systems for ventilating and air conditioning. The most satisfactory automatic control systems are based on the use of single-acting pneumatic motors to actuate dampers, and with the increasing size of dampers the use of higher pneumatic pressures to operate them is foreseeable.

A single-acting motor requires a return spring, and conventional return spring mechanisms to develop the contemplated forces are objectionably large and unwieldy. Applicant has developed a remarkably compact single-acting pneumatic motor in which the return spring takes the form of a pneumatic cushion. This is the subject matter of his application Serial No. 501,251, filed April 14, 1955. The improved damper motors there disclosed take various specifically different forms chosen to afford desired force patterns and desirable free action.

The present invention is applicable to various of the types shown in the prior application, but for disclosure purposes will be here illustrated as applied to the simplest embodiment of the concept there claimed.

The present application is directed to the problem of possible leakage from the air cushion, and provides arrangements which are simple and serve to charge the cushion space from the motor space, should moderate leakage from the cushion space occur.

Two embodiments of the invention are illustrated in the accompanying drawing,

Fig. 1 shows in axial section a simple single-acting pneumatic motor with air-spring return with the invention applied by the use of a check valve and pressure-reducing valve.

Fig. 2 shows an identical motor with the invention applied in a still simpler form.

Since the motor is the same in the two figures it will be described first, using the same reference numerals for both figures.

A base 6 carries in coaxial relation, two open-ended cylindrical sleeves 7 and 8 which have equal internal diameters. The sleeve 7 is the motor sleeve and has a cup-shaped head 9 with pipe connection 11.

The head 9 and sleeve 7 have mating flanges between which is sealed and clamped the terminal flange 12 of a rolling seal member 13. The rolling seal member is a tube folded through itself and having a flat closed end 14.

The sleeve 8 is the cushion sleeve and has a head 15 with pipe connection 16. The head 15, like the head 9, is cup-shaped, but is deeper (i. e. its axial dimension is greater so that it offers a large clearance volume). The sleeve 8 and head 15 are flanged and clamp between them the terminal flange 17 of a rolling seal member 18 (similar to member 13) which is a tube folded through itself and having a flat closed end 19.

The rolling seal is of a synthetic rubber substitute characterized by resistance to the harmful effects of heat, age and oil. It requires no fabric or cord reinforcement, and omission of reinforcement is considered desirable.

Floating on the folds of the members 13 and 18 and reacting between their closed ends 14 and 19 is an assembly comprising the cup-shaped piston heads 21 and 22 connected by rod 23. The rod carries a hub 24 to which the damper mechanism (not shown) is connected.

The motors of Figs. 1 and 2 have now been described.

Refer now to Fig. 1. The line 25 is the branch line from a control instrument such as the relay (not shown) of Otto Patent No. 1,500,260, dated July 8, 1924. This leads directly to the motor space, and indirectly to the cushion space. The direct connection to connection 11 energizes the pneumatic damper motor.

The indirect connection leads through a check valve 26, whose sole function is to prevent back flow, through a pressure reducing valve 27 to connection 16. The pressure reducing valve 27 responds to pressure on its discharge side and is conventionally illustrated. A diaphragm 28 is peripherally clamped between the parts 29 and 30 of a housing and is subject in a valve closing direction to pressure in the exit chamber 32. In the entrance chamber 31 is a poppet valve 34 controlling flow to exit chamber 32 and biased to close by a spring 35 and entrance pressure. A thrust member 36 carried by the center of the diaphragm and loaded by spring 37 reacts on valve 34 in an opening direction. The stress on spring 37 is adjustable by turning thrust screw 38.

The reducing valve 27 when appropriately adjusted charges the cushion space from line 25 to maintain a desired minimum pressure in the air cushion, and will do so against considerable leakage from the cushion.

The purpose in using the pressure reducing valve is twofold. The first purpose is to assure delay of the start of piston movement until the pressure in the motor chamber has built up to a value determined by the adjusting screw 38. The second purpose is to assure that the cushion space will be filled with the proper amount of air even though there may be a slight leak from the cushion space.

The arrangement functions as follows: Let us assume that the pistons 21 and 22 are in the starting position as shown by Figure 1 and there is atmospheric pressure in the motor and also the cushion. Let us further assume that the compression of spring 37 is so adjusted that 5 p. s. i. pressure above atmospheric is required in chamber 32 to seat valve member 34 against its valve seat. As long as the pressure in chamber 32 is less than 5 p. s. i. g. the valve 34 is open. If now the branch pressure in line 25 increases, the pressure will enter the motor and the cushion at the same time (since valve 34 is open) and consequently the pistons will not move. The pistons will remain inoperative until the pressure throughout the system reaches 5 p. s. i. when the valve 34 will close. If now the pressure in line 25 continues to increase, the pistons will start moving to the right and the cushion, being a closed space now, will function as a pneumatic spring. It will be noted that the pressure at which piston movement starts is determined by the setting of screw 38 and spring 37. If a number of pneumatic operators are controlled from one thermostat it is often required to stagger their starting pressures so that they operate in a desired sequence. This can be easily done with the described apparatus.

The controlled air pressure, which is connected to line 25, usually fluctuates considerably to meet the requirements of shifting heating or cooling loads. Each time this pressure decreases to a low value, the pistons will return to their starting position and valve 34 will then be open. On increasing branch pressure the apparatus will then go through the cycle described in the preceding paragraph, which results in a replenishing of any air that may have been lost from the pneumatic spring through a leak.

In Fig. 2 the pistons 21 and 22 have equal effective areas. The connection 25a leads directly to pipe connection 11 and to connection 16 through an adjustable restrictor (needle valve) 41. Valve 41 is set to afford only a very minute flow. If the air spring does not leak, it has no appreciable effect. If the air spring leaks to any amount less than the adjusted flow capacity of restrictor 41, the leakage will be neutralized. The scheme is a very desirable addition since nearly all rubberlike plastics have at least a minor leakage. However, modern Butyl rubber compounds are remarkably free from leakage for long periods of time.

Two embodiments of the broad concept have been described to indicate the scope of the invention, which is by no means limited to particular embodiments.

What is claimed is:

1. A damper motor comprising in combination, two relatively opposed single-acting expansible chamber units having each a cylinder and also having mechanically connected pistons reciprocable in respective cylinders, one unit having a connection for the supply and exhaust of pneumatic pressure fluid to cause the unit to function as a motor and the other being closed to cause it to function as a pneumatic spring opposing movements of said motor; and means rendered effective by leakage of fluid from the pneumatic spring and serving to supply make-up fluid to the spring from said motor.

2. The combination defined in claim 1 in which the means rendered effective by leakage comprises a restricted communication between the expansible chambers of the two units.

3. The combination defined in claim 1 in which the means rendered effective by leakage is a communication from the expansible chamber of the motor unit to the expansible chamber of the spring unit comprising, in the order stated, a check valve opening toward the spring unit and a pressure reducing valve which moves in a closing direction in response to rising pressure in its discharge.

4. The combination defined in claim 1 in which the cylinders of the two units are coaxial and the pistons of the two units are connected rigidly and float on rolling seals which encircle respective pistons and seal the annular interval between each piston and its cylinder.

5. The combination defined in claim 2 in which the cylinders of the two units are coaxial and the pistons of the two units are connected rigidly and float on rolling seals which encircle respective pistons and seal the annular interval between each piston and its cylinder.

6. The combination defined in claim 3 in which the cylinders of the two units are coaxial and the pistons of the two units are connected rigidly and float on rolling seals which encircle respective pistons and seal the annular interval between each piston and its cylinder.

References Cited in the file of this patent

UNITED STATES PATENTS

| 2,133,170 | Johnson | Oct. 11, 1938 |
| 2,452,176 | Bent | Oct. 26, 1948 |

FOREIGN PATENTS

| 764,509 | France | Mar. 5, 1934 |